(12) United States Patent
Ogawa et al.

(10) Patent No.: US 9,412,995 B2
(45) Date of Patent: Aug. 9, 2016

(54) ELECTRODE AND ELECTROCHEMICAL DEVICE

(75) Inventors: Kazuya Ogawa, Tokyo (JP); Kiyonori Hinoki, Tokyo (JP); Yousuke Miyaki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 1287 days.

(21) Appl. No.: 12/056,509

(22) Filed: Mar. 27, 2008

(65) Prior Publication Data
US 2008/0241655 A1     Oct. 2, 2008

(30) Foreign Application Priority Data

Mar. 29, 2007   (JP) ................................ P2007-088999

(51) Int. Cl.
| | |
|---|---|
| H01M 10/60 | (2014.01) |
| H01M 4/131 | (2010.01) |
| H01M 10/653 | (2014.01) |
| H01M 4/485 | (2010.01) |
| H01M 10/0525 | (2010.01) |
| H01M 10/42 | (2006.01) |
| H01M 10/647 | (2014.01) |
| H01M 10/654 | (2014.01) |
| H01M 10/613 | (2014.01) |
| H01M 10/659 | (2014.01) |
| H01M 4/1391 | (2010.01) |

(52) U.S. Cl.
CPC ............. *H01M 4/131* (2013.01); *H01M 4/485* (2013.01); *H01M 10/0525* (2013.01); *H01M 10/4235* (2013.01); *H01M 10/613* (2015.04); *H01M 10/647* (2015.04); *H01M 10/653* (2015.04); *H01M 10/654* (2015.04); *H01M 10/659* (2015.04); *H01M 4/1391* (2013.01); *Y02E 60/122* (2013.01)

(58) Field of Classification Search
CPC .............................. H01M 4/765; H01M 4/653
See application file for complete search history.

(56) References Cited

U.S. PATENT DOCUMENTS

| | | | |
|---|---|---|---|
| 6,136,475 A | 10/2000 | Tsutsumi et al. | |
| 7,811,704 B2 * | 10/2010 | Hall ...................... | H01M 4/244 429/213 |
| 2003/0087154 A1 * | 5/2003 | Ohzuku ................ | H01M 4/505 429/231.1 |

(Continued)

FOREIGN PATENT DOCUMENTS

| | | |
|---|---|---|
| CN | 1311903 A | 9/2001 |
| EP | 1 134 828 A1 | 9/2001 |

(Continued)

OTHER PUBLICATIONS

Hammami, Raymond, Armand, Lithium-ion batteries: Runaway risk of forming toxic compounds, Aug. 7, 2003, Nature 424, 635-36.*

(Continued)

*Primary Examiner* — Scott J Chmielecki
(74) *Attorney, Agent, or Firm* — Oliff PLC

(57) ABSTRACT

An electrode is provided as one capable of achieving further improvement in safety of an electrochemical device when exposed to a high-temperature environment, and an electrochemical device is provided as one using the electrode. The electrode has a current collector, an endothermic material layer provided on the current collector, and an active material layer provided on the endothermic material layer. The endothermic material layer contains an endothermic material absorbing heat at 80° C. or higher in a differential scanning calorimetry curve thereof.

14 Claims, 5 Drawing Sheets

(56) References Cited

U.S. PATENT DOCUMENTS

| | | | | | |
|---|---|---|---|---|---|
| 2004/0253397 | A1* | 12/2004 | Hayes | ................ | A23G 7/02 428/34.1 |
| 2005/0233219 | A1* | 10/2005 | Gozdz | ................ | H01M 4/13 429/231.95 |
| 2006/0199294 | A1* | 9/2006 | Fujikawa | ................ | H01M 2/16 438/42 |
| 2008/0318130 | A1* | 12/2008 | Ogawa | ................ | H01M 4/0404 429/231.95 |

FOREIGN PATENT DOCUMENTS

| | | |
|---|---|---|
| JP | A-9-7602 | 1/1997 |
| JP | A 10-64549 | 3/1998 |
| JP | A 11-233150 | 8/1999 |
| JP | A-11-293444 | 10/1999 |
| JP | A 2001-273885 | 10/2001 |
| WO | WO 02/41422 A1 | 5/2002 |

OTHER PUBLICATIONS

Hammami, Raymond et al; Lithium-Ion Batteries: Runaway Risk of Forming Toxic Compounds; Aug. 7, 2003; Nature 424, 635-36.*

English-language translation of Japanese Office Action for Application No. 2007-088999, issued Nov. 10, 2009.

Notification of First Office Action for corresponding Chinese Patent Application No. 200810086924.2, mailed on Dec. 14, 2010.

* cited by examiner

Fig.5

| | ACTIVE MATERIAL | THERMORUNAWAY PEAK TEMPERATURE (°C) | ENDOTHERMIC MATERIAL LAYER | THICKNESS OF ENDOTHERMIC MATERIAL LAYER | INTEGRAL ENDOTHERMIC AMOUNT OF ENDOTHERMIC INTERVAL IN DSC CURVE PER UNIT AREA OF ENDOTHERMIC MATERIAL LAYER | THERMORUNAWAY OCCURRENCE RATE IN 160°C HEAT TEST AFTER 4.2V FULL CHARGE |
|---|---|---|---|---|---|---|
| EXAMPLE A1 | LiCoO$_2$ | 250 | Al(OH)$_3$ | 5nm | 2.4×10$^{-3}$ J/cm$^2$ | 10% |
| EXAMPLE A2 | LiCoO$_2$ | 250 | Al(OH)$_3$ | 10nm | 4.9×10$^{-3}$ J/cm$^2$ | 0% |
| EXAMPLE A3 | LiCoO$_2$ | 250 | Al(OH)$_3$ | 50nm | 2.4×10$^{-2}$ J/cm$^2$ | 0% |
| COMPARATIVE EXAMPLE A1 | LiCoO$_2$ | 250 | NONE | — | — | 100% |
| EXAMPLE B1 | LiMn$_2$O$_4$ | 300 | Al(OH)$_3$ | 10μm | 4.9×10$^{-3}$ J/cm$^2$ | 0% |
| COMPARATIVE EXAMPLE B1 | LiMn$_2$O$_4$ | 300 | NONE | — | — | 80% |
| EXAMPLE C1 | LiNi$_{0.8}$Co$_{0.15}$Al$_{0.05}$O$_2$ | 310 | Al(OH)$_3$ | 10μm | 4.9×10$^{-3}$ J/cm$^2$ | 0% |
| COMPARATIVE EXAMPLE C1 | LiNi$_{0.8}$Co$_{0.15}$Al$_{0.05}$O$_2$ | 310 | NONE | — | — | 95% |
| EXAMPLE D1 | LiNi$_{0.55}$Mn$_{0.3}$Co$_{0.1}$O$_2$ | 315 | Al(OH)$_3$ | 10μm | 4.9×10$^{-3}$ J/cm$^2$ | 0% |
| COMPARATIVE EXAMPLE D1 | LiNi$_{0.55}$Mn$_{0.3}$Co$_{0.1}$O$_2$ | 315 | NONE | — | — | 90% |

ELECTRODE AND ELECTROCHEMICAL DEVICE

BACKGROUND OF THE INVENTION

1. Field of the Invention

The present invention relates to an electrode and an electrochemical device.

2. Related Background Art

There are conventionally known electrochemical devices such as lithium-ion secondary batteries. These electrochemical devices are required to provide safety in high-temperature environments. For preventing increase in temperature of the device, there are known devices in which an endothermic material is contained in an active material layer (cf. Japanese Patent Application Laid-open Nos. 2001-273885, 10-64549, and 11-233150, and Japanese Patent Application Republished No. 2002-41422).

SUMMARY OF THE INVENTION

There are, however, needs for further improvement in safety of the conventional lithium-ion secondary batteries in high-temperature environments.

The present invention has been accomplished in order to meet the above needs and an object of the present invention is to provide an electrode capable of achieving further improvement in safety of an electrochemical device when exposed to a high-temperature environment, and an electrochemical device using the electrode.

An electrode according to the present invention comprises a current collector; an endothermic material layer provided on the current collector; and an active material layer provided on the endothermic material layer; and the endothermic material absorbs heat by dehydration decomposition.

When the ambient temperature becomes high, the largest amount of ambient heat normally flows from the current collector with extremely high heat conduction into the active material layer. In the present invention, however, the endothermic material layer to absorb heat exists on the current collector, and it suppresses flow of heat from the current collector into the active material layer. Particularly, the absorption of heat by dehydration decomposition is preferable because it exhibits a significant amount of heat absorbed.

The endothermic material herein is preferably one that starts absorbing heat at 60° C. or higher in a differential scanning calorimetry curve and preferably one that starts absorbing heat at 200° C. or higher. Many active materials go thermorunaway at 200° C. or higher and therefore the thermorunaway of the active material layer is effectively suppressed when the endothermic material starts absorbing heat at 60° C. or higher, particularly, at 200° C. or higher.

The endothermic material preferably has an endothermic start temperature at or below a thermorunaway peak temperature of the active material. It is also preferable that a temperature range showing the absorption of heat in the differential scanning calorimetry curve of the endothermic material include the thermorunaway peak temperature of the active material. These enhance the effect of suppressing the thermorunaway.

The endothermic material is preferably a metal hydroxide. Since this endothermic material layer of the metal hydroxide has hydroxyl groups in its surface, excellent adhesion is achieved between the current collector and the active material layer. Since the metal hydroxide is also an inorganic material, the material itself does not burn easily and offers high safety.

The endothermic material is preferably a hydroxide of a constituent material of the current collector. This facilitates production because the endothermic material layer can be formed by treating the surface of the current collector.

In a particularly preferred form, the active material is a lithium-containing metal oxide, the endothermic material is aluminum hydroxide, and a thickness of the endothermic material layer is 10 to 50 nm.

It is also preferable that the endothermic material layer is formed throughout the entire surface between the current collector and the active material layer.

An electrochemical device according to the present invention comprises the above-described electrode.

The present invention achieves further improvement in the safety of the electrochemical device when exposed to a high-temperature environment.

BRIEF DESCRIPTION OF THE DRAWINGS

FIG. 5 is a table showing the conditions and results in examples and comparative examples.

16 current collector; 18 endothermic material layer; 20 active material layer; 140 electrode; 100 lithium-ion secondary battery.

DESCRIPTION OF THE PREFERRED EMBODIMENTS

A preferred embodiment of application of the present invention will be described below in detail with reference to the drawings. The same elements will be denoted by the same reference symbols in the description of the drawings as much as possible, and redundant description will be omitted in some cases.

(Electrode)

Figure 1:
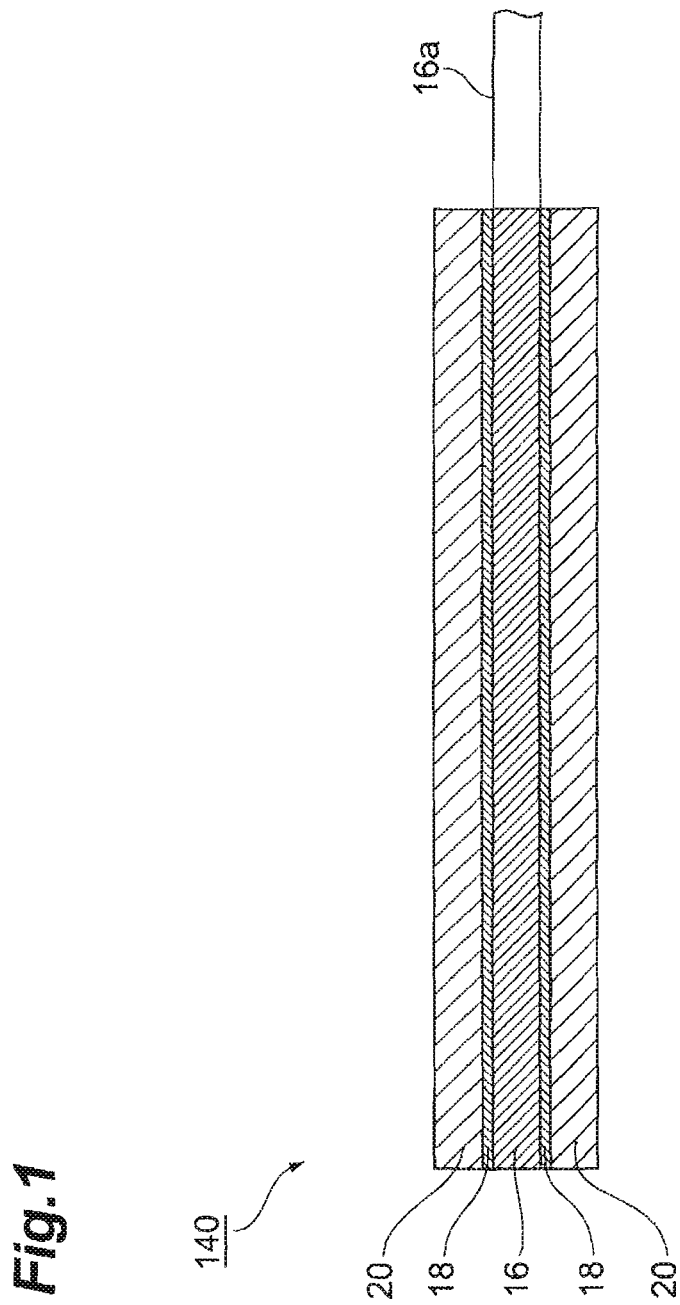
FIG. 1 is a partly cross-sectioned schematic configuration diagram of a cathode according to an embodiment of the present invention.

As shown in FIG. 1, an electrode 140 has a current collector 16, endothermic material layers 18, 18 formed on the two faces of the current collector 16, and active material layers 20, 20 provided on the respective endothermic material layers 18, 18.

There are no particular restrictions on the thickness of the current collector 16, but the thickness can be, for example, 5-100 μm. A tongue-like portion 16a is formed as an outward extension at one end of the current collector 16. The current collector 16 can be an aluminum foil, a copper foil, a nickel foil, or the like.

The active material layer 20 is a layer containing an active material, a conductive aid, a binder, and so on.

There are no particular restrictions on the active material for a cathode of a lithium-ion secondary battery as long as it can implement reversible progress of occlusion and release of lithium ions, desorption and insertion (intercalation) of lithium ions, or doping and dedoping with lithium ions and counter anions (e.g., $ClO_4^-$) to the lithium ions. Any one of the known electrode active materials can be used. For example, there may be mentioned lithium-containing metal oxides. Examples of the lithium-containing metal oxides are lithium cobaltate ($LiCoO_2$), lithium nickelate ($LiNiO_2$), lithium manganese spinel ($LiMn_2O_4$), composite metal oxides represented by general formula: $LiNi_xCo_yMn_zO_2$ (x+y+z=1), lithium vanadium compounds ($LiV_2O_5$), olivine type $LiMPO_4$ (where M is Co, Ni, Mn, or Fe), lithium titanate ($Li_4Ti_5O_{12}$), and so on.

There are no particular restrictions on the active material for an anode of a lithium-ion secondary battery as long as it can implement reversible progress of occlusion and release of lithium ions, desorption and insertion of lithium ions, or doping and dedoping with lithium ions and counter anions thereto (e.g., $ClO_4^-$). Any one of materials used in well-known lithium-ion secondary battery elements can be used. There may be mentioned, for example, carbon materials such as natural graphite, artificial graphite, mesocarbon microbeads, mesocarbon fiber (MCF), cokes, glasslike carbon, and burned substances of organic compounds; metals such as Al, Si, and Sn capable of combining with lithium; amorphous compounds consisting primarily of an oxide such as $SiO_2$ or $SnO_2$; lithium titanate ($Li_4Ti_3O_{12}$), and so on.

As an electrode for an electric double-layer capacitor, there may be mentioned well-known porous materials with electron conductivity. Examples of applicable materials are preferably carbon materials such as natural graphite, artificial graphite, mesocarbon microbeads, mesocarbon fiber (MCF), cokes, glasslike carbon, and burned substances of organic compounds.

There are no particular restrictions on the conductive aids as long as it can enhance the electric conductivity of the active material layer 20, and any one of the well-known conductive aids can be used. As a conductive aids, for example, there may be mentioned carbon blacks, carbon materials, fine powders of metals such as copper, nickel, stainless steel, and iron, mixtures of the carbon materials and metal fine powders, and electrically conductive oxides such as ITO. It is noted that the present invention can be carried out without containing the conductive aid.

There are no particular restrictions on the binder as long as it can bind particles of the active material and particles of the conductive aid to the current collector 16, and any one of the well-known binders can be used. There may be mentioned, for example, fluorocarbon polymers such as polyvinylidene fluoride (PVDF), polytetrafluoroethylene (PTFE), tetrafluoroethylene-hexafluoropropylene copolymer (FEP), tetrafluoroethylene-perfluoroalkyl vinyl ether copolymer (PEA), ethylene-tetrafluoroethylene copolymer (ETFE), polychlorotrifluoroethylene (PCTFE), an ethylene-chlorotrifluoroethylene copolymer (ECTFE), polyvinyl fluoride (PVF); styrene-butadiene rubber (SBR), and so on.

There are no particular restrictions on a the thickness of the active material layer 20, but the thickness can be, for example, 10 to 200 μm.

In the present embodiment, particularly, the endothermic material layer 18 exists between the current collector 16 and each active material layer 20. This endothermic material layer is a layer containing an endothermic material that absorbs heat by dehydration decomposition. The material to absorb heat by dehydration decomposition absorbs a relatively large amount of heat. Among the endothermic materials to absorb heat by dehydration decomposition, it is preferable to use an endothermic material starting absorbing heat at 80° C. or higher in a differential scanning calorimetry (DSC) curve and it is also preferable to use an endothermic material starting absorbing heat at 200° C. or higher. Many active materials go thermorunaway at 200° C. or higher, and the thermorunaway of the active material can be effectively suppressed when the endothermic material starts absorbing heat at 60° C. or higher; particularly, at 200° C. or higher.

Figure 2:
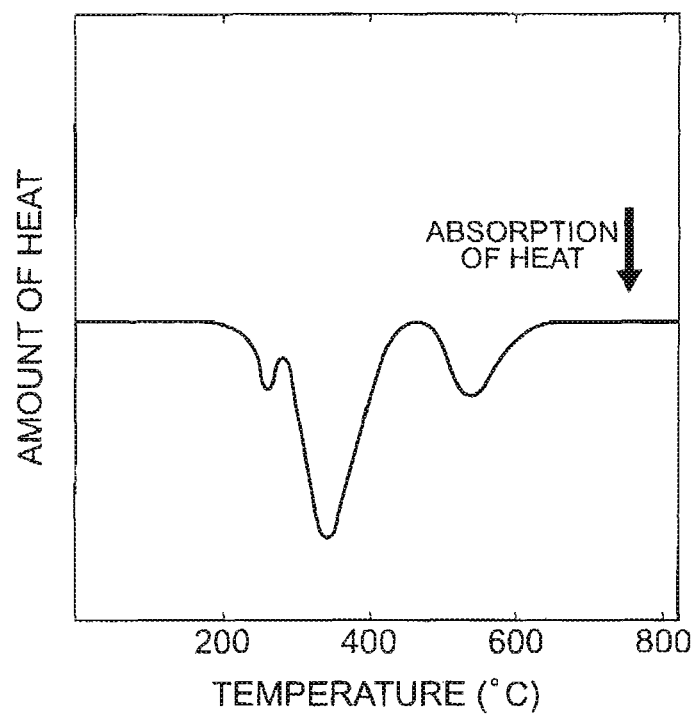
FIG. 2 is a DSC curve of aluminum hydroxide.

Concretely, as an endothermic materials, for example, there may be mentioned metal hydroxides such as aluminum hydroxide ($Al(OH)_3$), copper hydroxide ($Cu(OH)_2$), magnesium hydroxide ($Mg(OH)_2$), nickel hydroxide ($Ni(OH)_2$) and the like. These metal hydroxides absorb heat by dehydration decomposition. For example, aluminum hydroxide has the endothermic start temperature of about 200° C. and absorbs a sufficient amount of heat at 200° C.-400° C. Copper hydroxide has the endothermic start temperature of about 60° C. and absorbs a sufficient amount of heat at 60° C.-80° C. Nickel hydroxide has the endothermic start temperature of 250° C. and magnesium hydroxide has the endothermic start temperature of 300° C. FIG. 2 shows the differential scanning calorimetry curve of aluminum hydroxide.

Particularly, when one of the metal hydroxides is used as the endothermic material, there is the advantage of improvement in adhesion between the current collector and the active material because they have the hydroxyl groups. Since the metal hydroxides are also inorganic materials, the endothermic material itself does not burn easily and thus provides high safety. Furthermore, the endothermic material is preferably a hydroxide of the material of the current collector 16 because production is easy.

The endothermic material preferably has the endothermic start temperature at or below the thermorunaway peak temperature of the active material. A temperature range indicating absorption of heat in the differential scanning calorimetry curve of the endothermic material, preferably includes the thermorunaway peak temperature of the active material. These enhance the effect of preventing the thermorunaway. The thermorunaway peak temperature of the active material herein is a value defined as a temperature of a peak with a largest maximum in a differential scanning calorimetry curve obtained in a state in which the active material is kept in contact with an electrolyte, and examples of the thermorunaway peak temperature of some active materials are as listed below.

TABLE 1

| ACTIVE MATERIAL | THERMORUNAWAY PEAK TEMPERATURE (° C.) |
|---|---|
| $LiNiO_2$ | 200 |
| $LiCoO_2$ | 250 |
| $LiMn_2O_4$ | 300 |
| $LiNi_{0.8}Co_{0.15}Al_{0.05}O_2$ | 310 |
| $LiNi_{0.55}Mn_{0.3}Co_{0.1}O_2$ | 315 |
| $LiFePO_4$ | >400 |

For example, when aluminum hydroxide is used as the endothermic material with the lithium-containing metal oxides as listed in Table 1, the endothermic material has the endothermic start temperature below the thermorunaway peak temperature of the active material and the endothermic temperature range in the differential scanning calorimetry curve of the endothermic material includes the thermorunaway peak temperature of the active material.

There are no particular restrictions on the thickness of the endothermic material layer 18, but the thickness is preferably determined so that an integral endothermic amount of an endothermic interval is not less than $4 \times 10^{-3}$ J/cm² per unit area of the endothermic material layer 18. An absorbable heat amount Q can be obtained by multiplying an absorbable amount $Q_0$ per unit weight [J/g], which is obtained by integrating an absorbed heat amount in an interval indicating absorption of heat in a differential scanning calorimetry curve of each endothermic material, by a supported amount of the endothermic material per unit area [g/cm²] in the endothermic material layer 18. Aluminum hydroxide has $Q_0$ of 2010 J/g.

There is no upper limit to the thickness of the endothermic material layer 18, but, for example, in the case of aluminum hydroxide, the thickness is preferably not more than 50 nm in order to keep the impedance sufficiently low, e.g., the electric resistivity per single layer of a battery with a pair of cathode and anode is not more than 10 Ω/cm².

This endothermic material layer 18 is preferably formed throughout the entire interface between the current collector 16 and the active material layer 20, but even in the case where the endothermic material layer 18 is formed in part of the interface between the current collector 16 and the active material layer 20, the safety at high temperatures can be improved when compared with the electrode without the endothermic material layer 18.

(Production Method of Electrode)

Firsts the current collector 16 is prepared. Then, the active material such as a powder of a lithium-containing metal oxide, the binder, and a necessary amount of the conductive aid are mixed in a solvent to prepare a paste, and this paste is applied onto the two faces of the current collector 16, for example, by the doctor blade method or the like, and dried to form the active material layers 20, 20.

Next, this electrode is immersed in an alkaline aqueous solution to form a hydroxide layer on the each surfaces of the current collector 16 in a predetermined thickness, whereby the hydroxide layer as the endothermic material layer 18 is formed between the current collector 16 and each active material layer 20.

When the electrode is immersed in the alkaline aqueous solution, the pH, temperature, and immersion time may be properly set according to the thickness of the hydroxide to be informed. As preferred alkaline aqueous solution, there may be mentioned aqueous solution of lithium hydroxide. The preferred pH of the alkaline aqueous solution is 11. The preferred immersion time is one hour.

If the electrode active material exhibits alkalinity upon contact with water (e.g., where it contains a lithium-containing metal oxide, particularly, a lithium-containing metal oxide containing nickel), the hydroxide layers can also be formed by letting the electrode with the active material layers stand in a high-humidity environment for a predetermined time.

Particularly, with a lithium-containing metal oxide that exhibits strong alkalinity upon contact with water, e.g., pH 10 or higher, the hydroxide layers as the endothermic material layers can be readily formed by the above-described production method. The degree of alkalinity can be evaluated as follows. For example, 5 wt % of the active material is mixed in pure water, the mixture is stirred for about ten minutes with a stirrer, then the mixture is left for 30 minutes, a supernatant solution is sampled, and its pH is measured with a pH meter or the like. Examples of such lithium-containing metal oxides exhibiting strong alkalinity include those listed in Table 2 below. The Li-containing metal oxides can vary the degree of alkalinity depending not only on the composition of the active material, but also on the production method thereof. The lithium-containing metal oxides containing nickel tend to demonstrate a high pH, as shown in Table 2, and are thus suitable for the present invention. The materials with the ratio of Ni of not less than 0.8 relative to the ratio of Li of 1 show the pH of not less than 11.7 and are particularly suitable for the present invention.

TABLE 2

| ACTIVE MATERIAL | pH |
|---|---|
| $Li(Ni_{1/3}Co_{1/3}Mn_{1/3})O_2$ | 10.7 |
| $Li(Ni_{0.8}Co_{0.1}Mn_{0.1})O_2$ | 11.7 |
| $Li(Ni_{0.8}Co_{0.15}Al_{0.05})O_2$ | 11.7 |
| $LiCoO_2$ | 10.1 |
| $Li_4Ti_5O_{12}$ | 11.2 |
| $LiNiO_2$ | 11.9 |
| $Li(Ni_{1/3}Co_{1/3}Mn_{1/3})O_2:LiMn_2O_4 = 1:1$ | 10.3 |

When the electrode is left in the high-humidity environment, the relative humidity, temperature, time, and the like. in the environment can be optionally set so as to achieve the desired thickness of the hydroxide layers. For example) preferred conditions are the environment with the relative humidity of 60-90%, the temperature of 25-60° C., and about 1-72 hours.

Then the electrode with the endothermic material layers 18 and the active material layers 20 formed as described above may be pressed, for example, with a roll press machine or the like as occasion may demand. The linear pressure of the roll press can be set, for example, to 10-50 kgf/cm.

(Action and Effect)

When the ambient temperature becomes high, the largest amount of ambient heat normally flows from the current collector with extremely high heat conduction into the active material layers 20. In the present invention, however, the endothermic material layer 18 to absorb heat by dehydration decomposition exists between the current collector 16 and each active material layer 20, so as to efficiently suppress the flow of heat from the current collector 16 into the active material layer 20. This can further improve the safety when exposed to a high-temperature environment.

(Lithium-Ion Secondary Battery)

Figure 3:
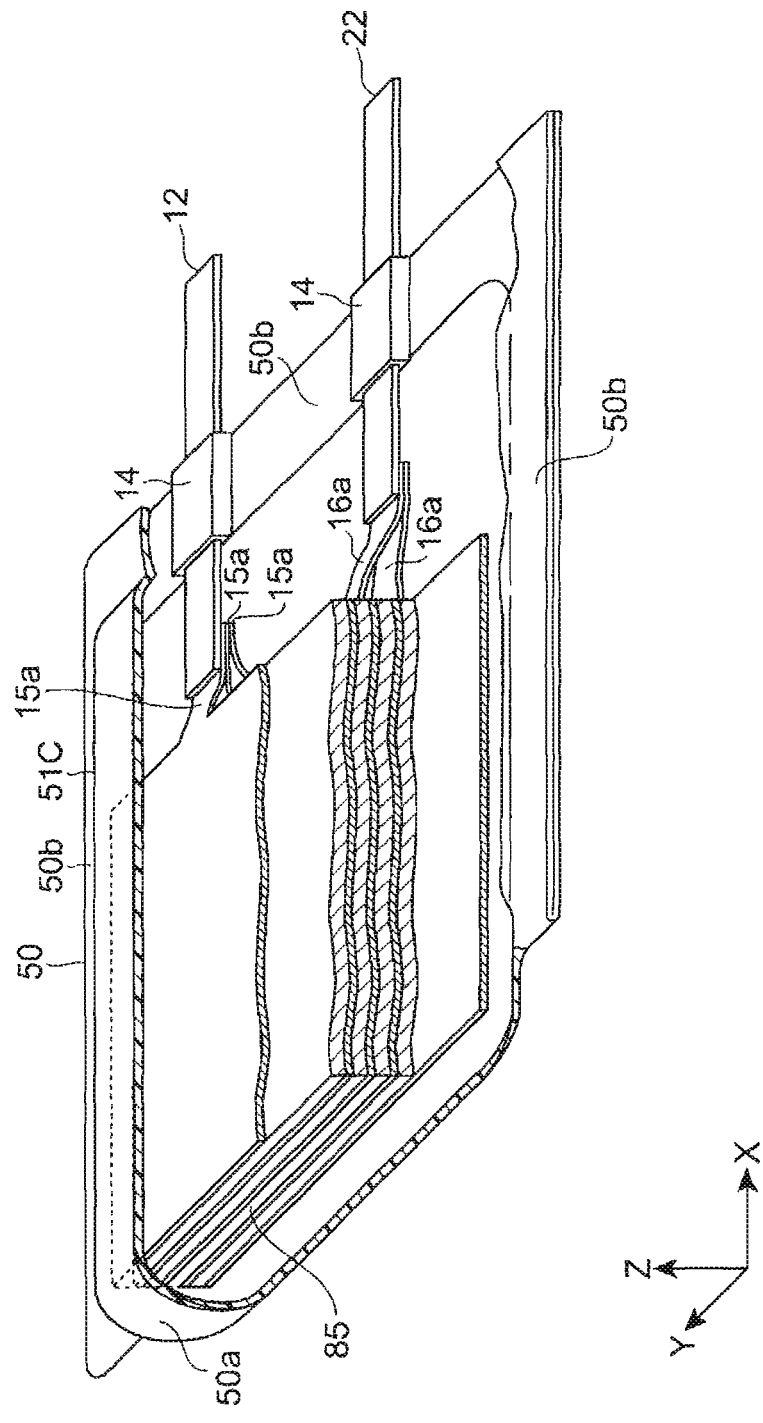
FIG. 3 is a partly broken perspective view of a lithium-ion secondary battery according to an embodiment of the present invention.
Figure 4:
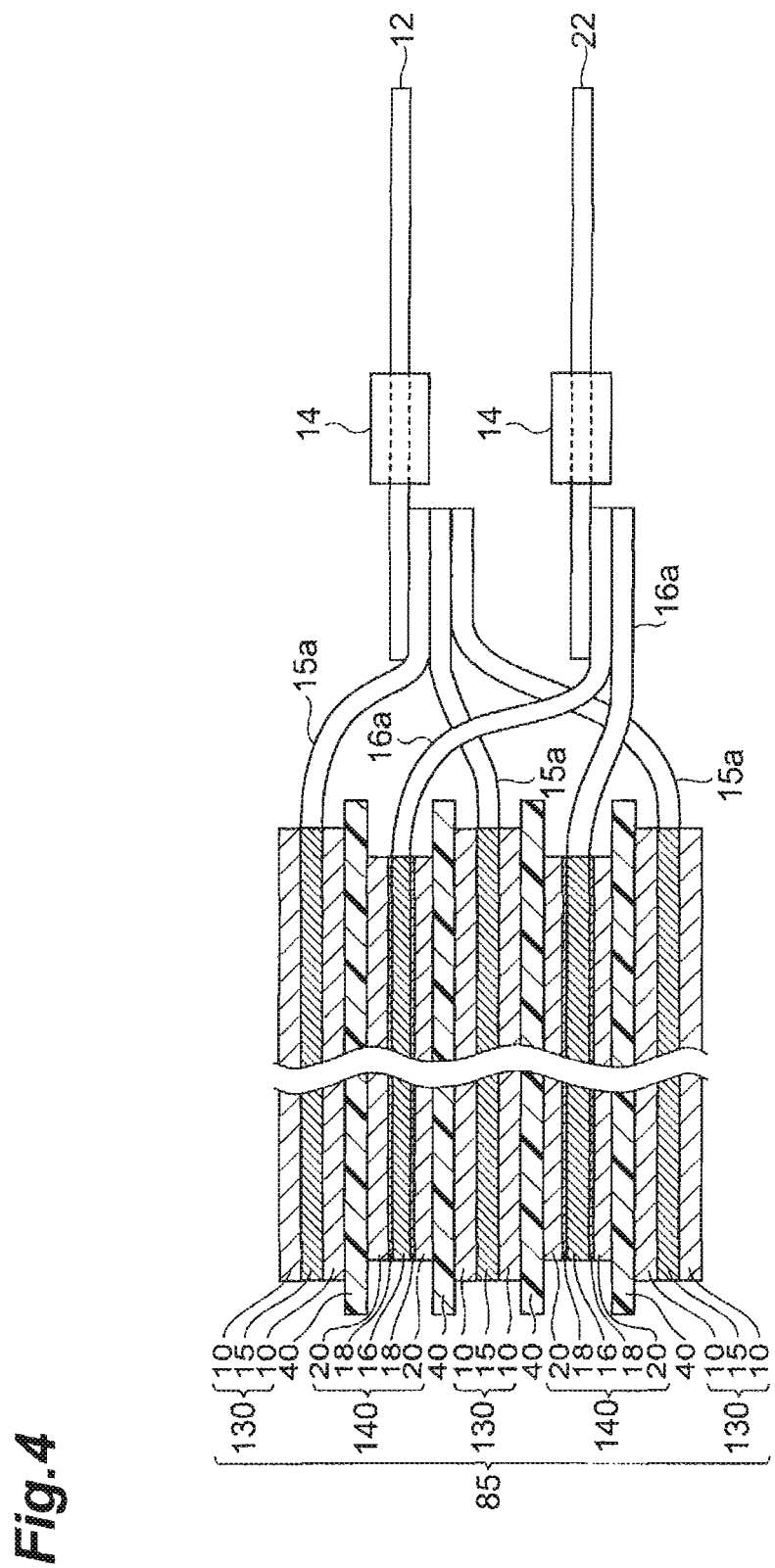
FIG. 4 is a sectional view along the ZX plane in FIG. 3.

An embodiment of the lithium-ion secondary battery according to the present invention will be described below in detail. FIG. 3 is a partly broken perspective view showing the lithium-ion secondary battery 100 of the embodiment of the present invention. FIG. 4 is a sectional view along the ZX plane of a laminate structure 85, a lead 22, and a lead 12 shown in FIG. 3.

The lithium-ion secondary battery 100 of the present embodiment is composed mainly of a laminate structure 85, a case (armor) 50 housing the laminate structure 85 in a hermetically closed state, and a lead 22 and a lead 12 for connection between the laminate structure 85 and the outside of the case 50.

The laminate structure 85 is a laminate, as shown in FIG. 4, by laminating an anode 130, a separator 40, a cathode 1410, a separator 40, an anode 130, a separator 40, a cathode 140, a separator 40, and an anode 130 in the order named from top. Each of the cathodes 140 is the above-described electrode. Each cathode 140 is laid so that its active material layers 20 are kept in contact with respective separators 40.

(Anode)

Each anode 130 has an anode current collector 15, and active material layers 10, 10 formed on the two faces of the anode current collector 15. The anode 130 is laid so that its active material layers 10 are kept in contact with respective separators 40.

There are no particular restrictions on material of the anode current collector 15 as long as it is a metal material normally used as a current collector for the anode in the lithium-ion secondary battery. The material can be, for example, copper, nickel, or the like. A tongue-like portion 15a is formed as an outward extension of each current collector at an end of the anode collector 15.

Each active material layer 10 is a layer containing an anode active material, a conductive aid, a binder, and so on.

There are no particular restrictions on the anode active material as long as it can implement reversible progress of occlusion and release of lithium ions, desorption and insertion of lithium ions, or doping and dedoping with lithium ions and counter anions thereto (e.g., $ClO_4^-$). Any one of the anode active materials in the well-known lithium-ion secondary battery elements can be used. For example there may be mentioned carbon materials such as natural graphite, artificial graphite, mesocarbon microbeads, mesocarbon fiber (MCF), cokes, glasslike carbon, and burned substances of organic compounds; metals such as Al, Si, and Sn capable of combining with lithium; amorphous compounds consisting primarily of an oxide such as $SiO_2$ or $SnO_2$; lithium titanate ($Li_4Ti_5O_{12}$), and so on.

Among the materials mentioned above, the carbon materials are preferably applicable. Particularly, the active material is more preferably the carbon materials with the interlayer distance $d_{002}$ of 0.335-0.338 nm and the crystallite size $Lc_{002}$ of 30-120 nm. Use of such materials permits more efficient progress of occlusion and release of lithium ions, or desorption and insertion of lithium ions. The carbon materials satisfying these conditions include artificial graphite, MCF, and so on. The interlayer distance $d_{002}$ and the crystallite size $Lc_{002}$ can be determined by X-ray diffractometry.

In the present embodiment, particularly, a supported amount of the anode active material in the active material layers 10 is preferably 2.0 to 15.0 mg/cm². The supported amount herein is a weight of the anode active material per unit area of the surface of the anode current collector 15.

The constituent elements except for the active material in the active material layers 10 can be the same materials as those forming the active material layers 20. The active material layers 10 also preferably contain the same conductive aid as the active material layers 20.

(Separator)

Each separator 40 disposed between the active material layer 10 and the active material layer 20 is made of an electrically insulating porous material. There are no particular restrictions on the material of the separators 40 and any one of the well-known separator materials can be used. As an electrically insulating porous materials, for example, there may be mentioned monolayer or multilayer bodies of film of polyethylene, polypropylene, or polyolefin, stretched films of mixtures of the foregoing polymers, nonwoven fabric of fiber consisting of at least one constituent material selected from the group consisting of cellulose, polyester, and polypropylene, and so on.

In the laminate structure 85, as shown in FIG. 4, on the plane view thereof the areas of the separators 40, the active material layers 10 (or anodes 130), and the active material layers 20 (or cathodes 140) decrease in the order named, the end faces of the active material layers 10 are projecting outward from the end faces of the active material layers 20, and the end faces of the separators 40 are projecting outward from the end faces of the active material layers 10. This configuration facilitates the following: if the layers have some positional deviation in the direction intersecting with the lamination direction because of errors or the like during production, the entire surface of the active material layers 20 can face the active material layers 10 in the laminate structure 85. Therefore, lithium ions released from each active material layer 20 are adequately taken through the separator 40 into the active material layer 10. Furthermore, since the separators 40 are larger than the active material layers 20 and the active material layers 10 and projecting from the end faces of the active material layers 20 and the active material layers 10, this configuration reduces short circuits due to contact between the active material layers 20 and the active material layers 10.

(Electrolyte Solution)

The electrolyte solution is contained in the active material layers 10, the active material layers 20, and the separators 40. There are no particular restrictions on the electrolyte solution, and the electrolyte solution, for example, an electrolyte solution (an aqueous electrolyte solution, or an electrolyte solution using an organic solvent) containing a lithium salt used in the well-known lithium-ion secondary battery elements, can be used. However, the aqueous electrolyte solution has a low electrochemical decomposition voltage and thus the withstanding voltage in charging is limited to a low level; therefore, it is preferable to adopt an electrolyte solution using an organic solvent (i.e., a nonaqueous electrolyte solution). The electrolyte solution of the secondary battery elements preferably used herein is a nonaqueous electrolyte solution in which a lithium salt is dissolved in a nonaqueous solvent (an organic solvent). The lithium salt used herein can be, for example, one of salts such as $LiPF_6$, $LiClO_4$, $LiBF_4$, $LiAsF_6$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$, and LiBOB These salts may be used singly or in combination of two or more.

Any one of solvents in the well-known secondary battery elements can be used. Preferably, for example, there may be mentioned propylene carbonate, ethylene carbonate, diethyl carbonate, and so on. These may be used singly or as a mixture of two or more at any ratio. Since the solvent composition significantly affects the safety, it was necessary before to select the solvent composition with consideration to the safety. However, the battery of the present invention generates little heat upon nail penetration, and thus offers a broad range of choices for the solvent composition, while being adaptable for any solvent composition.

In the present embodiment the electrolyte solution may be a gel electrolyte obtained by adding a gelatinizing agents as well as the liquid electrolyte. A solid electrolyte (a solid polymer electrolyte or an electrolyte consisting of an ion-conductive inorganic material) may be contained instead of the electrolyte solution.

(Leads)

The lead 22 and lead 12 have a ribbon-like contour and are projecting outward through a sealed portion 50b from the interior of the case 50.

The lead 22 is made of a conductive material such as metal. For example, aluminum or the like can be employed as this conductive material. The end of the lead 22 in the case 50 is joined to each of the tongue-like portions 16a, 16a of the respective cathode current collectors 16, 16 by resistance welding or the like, as shown in FIG. 4, and the lead 22 is electrically connected through each cathode current collector 16 to each active material layer 20.

On the other hand, the lead 12 is also made of a conductive material such as metal. For example, a conductive material such as copper or nickel can be used as this conductive material. The end of the lead 12 in the case 50 is welded to each of the tongue-like portions 15a, 15a, 15a of the respective anode collectors 15, 15, 15 and the lead 12 is electrically connected through each anode current collector 15 to each active material layer 10.

Each of portions of the leads 22, 12 pinched by the sealed portion 50b of the case 50 is covered by an insulator 14 such as resin, as shown in FIGS. 3 and 4, in order to enhance the sealing performance. There are no particular restrictions on the material of the insulators 14, but each insulator is preferably made, for example, of a synthetic resin. The lead 22 and the lead 12 are separated from each other in the direction perpendicular to the lamination direction of the laminate structure 85.

(Case)

There are no particular restrictions on the case 50 as long as it can hermetically seal the laminate structure 85 and prevent intrusion of air and water into the case, and any one of cases in the well-known secondary battery elements can be used. For example, the case made of synthetic resin such as epoxy resin, or made by laminating metal sheet of aluminum or the like with resin can be used. The case 50, as shown in FIG. 3, is one obtained by folding a rectangular flexible sheet 51C into two parts on a nearly longitudinal center thereof, and sandwiches the laminate structure 85 between them on both sides in the lamination direction (up and down direction). Among the edges of the sheet SIC folded into two parts, sealed portions 50b of three sides except for a folded portion 50a are bonded by heat sealing or with an adhesive to hermetically seal the laminate structure 85 inside. The case 50 is bonded to the insulators 14 in the sealed portion 50b to seal the leads 22, 12.

The present invention is not limited to the above embodiments but can be modified in various ways. For example, the cathode 140 in FIG. 1 or FIG. 4 has the active material layers 20 and endothermic material layers 18 formed on the two sides of the current collector 16, but it may also be one in which an active material layer 20 and an endothermic material layer 18 are formed on only one side.

FIG. 4 shows the laminate in which a plurality of cathodes and anodes are stacked, but the battery may be one having only a pair of a cathode and an anode.

The above embodiment showed the example of the lithium-ion secondary battery using the aforementioned electrode 140 as its cathodes, but the battery may be one using the electrode 140 as its anodes, or one having the cathode and anode made using the endothermic material layer as in the electrode 140. The above embodiment showed the example of the lithium-ion secondary battery, but the present invention can also be carried out as an electrochemical capacitor such as an electric double-layer capacitor using the aforementioned electrode 140.

Example A1

(Preparation of Cathodes)

The cathodes were prepared according to the following procedure. 90 parts by weight of $LiCoO_2$ with the pH of 7.5 as a cathode active material, 5 parts by weight of acetylene black as a conductive aid, and 5 parts by weight of polyvinylidene fluoride (PVdF) as a binder were mixed and dispersed with a planetary mixer, and an appropriate amount of NMP was added to adjust the viscosity, thereby obtaining a coating solution of a slurry form.

The coating solution obtained was applied in the active material-supported amount of 22.5 mg/cm² onto an aluminum foil (20 μm) as a current collector by the doctor blade method, and dried. The dried electrode sheet was stored in a 40° C. 90%-humidity environment for one hour to form aluminum hydroxide layers 5 nm thick. This cathode sheet was pressed with calender rolls so as to achieve the porosity of 30°, in the active material layers. The cathode sheet after the press was punched in the size of 30.5 mm×41 mm to obtain cathodes.

(Preparation of Anodes)

92 parts by weight of natural graphite as an anode active material and 8 parts by weight of PVdF as a binder were mixed and dispersed with a planetary mixer and thereafter an appropriate amount of NMP was added to adjust the viscosity, thereby obtaining a coating solution of a slurry form. The coating solution obtained was applied in the active material-supported amount of 100.5 mg/cm² onto a copper foil (15 μm) as a current collector by the doctor blade method, and dried. The anode sheet thus produced was pressed with calender rolls so as to achieve the porosity of 30% in the active material layers. The anode sheet after the press was punched in the size of 31 mm×41.5 mm.

(Fabrication of Battery)

Next, pairs of cathodes and anodes were stacked in ten layers so that a polyolefin separator (thickness: 25 μm, Gurley aeration time: 100 sec) punched in the size of 32 mm×43 mm was interposed between each pair of cathode and anode, and the two end faces of the stack were thermally compressed to obtain a battery laminate. The both of the cathodes and anodes were extended in part in a ribbon shape to form connection terminals. The electrolyte solution used herein was a nonaqueous electrolyte solution in which a solvent was propylene carbonate (PC), ethylene carbonate (EC), and diethyl carbonate (DEC) at the volume ratio of 2:1:7, the solute was $LiPF_6$ at the rate of 1 mol dm⁻³, and 1,3-propane sultone (5 parts by weight) was dissolved.

Using the nonaqueous electrolyte solution and the laminate obtained in the above steps, a multilayer lithium-ion secondary battery was fabricated according to the following procedure. The above-described electrode group was inserted into an armor consisting of an aluminum laminate film. The electrode group was kept in a vacuum vessel in a state in which it was set in the armor, and the aforementioned nonaqueous electrolyte solution was poured into the armor to impregnate the electrode group with the nonaqueous electrolyte solution. After completion of impregnation with the nonaqueous electrolyte solution, an unsealed portion of the armor was sealed in a reduced pressure state to obtain a multilayer lithium-ion secondary battery.

(Evaluation of Battery)

The battery thus fabricated was fully charged at 4.2 V, and thereafter it was heated at 160° C., and a rate of occurrence of thermorunaway (smoking) bursting, or ignition) was measured.

Examples A2, A3

Batteries of Examples A2 and A3 were fabricated in the same manner as in Example A1, except that the thickness of the endothermic material layer was 10 nm or 50 nm, respectively.

Comparative Example A1

A battery of Comparative Example A1 was fabricated in the same manner as in Example A1, except that the endothermic material layers were not formed.

Example B1

A battery of Example B1 was fabricated in the same manner as in Example A1, except that $LiMn_2O_4$ was used as the cathode active material.

Comparative Example B1

A battery of Comparative Example B1 was fabricated in the same manner as in Example B1, except that the endothermic material layers were not formed.

Example C1

A battery of Example C1 was fabricated in the same manner as in Example A1, except that $LiNi_{0.8}Co_{0.15}Al_{0.05}O_2$ was used as the cathode active material.

Comparative Example C1

A battery of Comparative Example C1 was fabricated in the same manner as in Example C1, except that the endothermic material layers were not formed.

Example D1

A battery of Example D1 was fabricated in the same manner as in Example A1, except that $LiNi_{0.55}Mn_{0.3}CO_{0.1}O_2$ was used as the cathode active material.

Comparative Example D1

A battery of Comparative Example D1 was fabricated in the same manner as in Example D1, except that the endothermic material layers were not formed.

The results are shown in FIG. 5. The examples with the endothermic material layers showed the better results in the heating test than the comparative examples.

What is claimed is:
1. An electrode comprising:
a current collector;
an endothermic material layer consisting of an endothermic material provided directly on the current collector; and
an active material layer provided on the endothermic material layer such that the endothermic material layer is positioned between the active material layer and the current collector,
wherein:
the endothermic material absorbs heat by dehydration decomposition; and
the endothermic material is a metal hydroxide.
2. The electrode according to claim 1, wherein the endothermic material starts absorbing heat at 60° C. or higher in a differential scanning calorimetry curve.
3. The electrode according to claim 1, wherein the endothermic material starts absorbing heat at 200° C. or higher in a differential scanning calorimetry curve.
4. The electrode according to claim 1, wherein the endothermic material has an endothermic start temperature at or below a thermorunaway peak temperature of the active material.
5. The electrode according to claim 1, wherein a temperature range showing absorption of heat in a differential scanning calorimetry curve of the endothermic material, includes a thermorunaway peak temperature of the active material.
6. The electrode according to claim 1, wherein the endothermic material is a hydroxide of a constituent material of the current collector.
7. The electrode according to claim 1, wherein:
the active material layer comprises a lithium-containing metal oxide as an active material,
the endothermic material is aluminum hydroxide, and
a thickness of the endothermic material layer is 10 to 50 nm.
8. An electrochemical device comprising the electrode according to claim 1.
9. The electrode according to claim 1, wherein the active material layer contains an active material in an amount of 2.0 to 15.0 $mg/cm^2$.
10. An electrode comprising:
a current collector;
an endothermic material layer consisting of an endothermic material provided directly on the current collector; and
an active material layer provided on the endothermic material layer such that the endothermic material layer is positioned between the active material layer and the current collector,
wherein:
the endothermic material absorbs heat by dehydration decomposition;
the endothermic material is a metal hydroxide; and
a thickness of the endothermic material layer is 10 to 50 nm.
11. The electrode according to claim 1, wherein an integral endothermic amount of an endothermic interval is not less than $4 \times 10^{-3}$ $J/cm^2$ per unit area of the endothermic material layer.
12. The electrode according to claim 10, wherein an integral endothermic amount of an endothermic interval is not less than $4 \times 10^{-3}$ $J/cm^2$ per unit area of the endothermic material layer.
13. The electrode according to claim 1, wherein the endothermic material layer is formed throughout an entire area between a surface of the current collector and a surface of the active material layer.
14. The electrode according to claim 10, wherein the endothermic material layer is formed throughout an entire area between a surface of the current collector and a surface of the active material layer.

* * * * *